US008762259B1

(12) United States Patent
Tyo et al.

(10) Patent No.: US 8,762,259 B1
(45) Date of Patent: Jun. 24, 2014

(54) REAL-TIME PRESCREENING FOR CREDIT OFFERS

(75) Inventors: James Tyo, Dayton, OH (US); Elaine Blagg-Hicks, San Antonio, TX (US); Dawn Toombs, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 304 days.

(21) Appl. No.: 11/859,135

(22) Filed: Sep. 21, 2007

(51) Int. Cl.
G06Q 40/00 (2012.01)

(52) U.S. Cl.
USPC .............................. 705/38; 705/35

(58) Field of Classification Search
USPC ...................................... 705/38, 35
See application file for complete search history.

(56) References Cited

U.S. PATENT DOCUMENTS

| | | | | |
|---|---|---|---|---|
| 5,341,429 | A * | 8/1994 | Stringer et al. | 705/52 |
| 6,088,686 | A | 7/2000 | Walker et al. | |
| 6,405,181 | B2 * | 6/2002 | Lent et al. | 705/38 |
| 2002/0010599 | A1 * | 1/2002 | Levison | 705/4 |
| 2002/0147669 | A1 * | 10/2002 | Taylor et al. | 705/35 |
| 2003/0078877 | A1 * | 4/2003 | Beirne et al. | 705/38 |
| 2003/0135462 | A1 * | 7/2003 | Brake et al. | 705/41 |
| 2004/0073903 | A1 | 4/2004 | Melchione et al. | |
| 2005/0021466 | A1 * | 1/2005 | Buchanan et al. | 705/42 |
| 2005/0097046 | A1 | 5/2005 | Singfield | |

OTHER PUBLICATIONS

Jones, Cliff; "New Credit offer means rates battle on the cards"; The Guardian (pre-1997 Fulltext); Feb. 17, 1996.*

Moss, Valerie; "Credit Offers and FCRA"; Credit Union Magazine, Dec. 2005.*

Equifax ePORT, [online], 6 pgs. [retrieved from the internet on Aug. 13, 2007 using <URL https://www.eport.equifax.com/eport/index.html and http://www.eportcms.equifax.com/cs/Satellite?c=Content_C&childpagename=ePort2/EP2Layout>.

Equifax ePORT tools, [online], 11 pgs. [retrieved from the internet on Aug. 13, 2007 using <URL https://www.eport.equifax.com/eport/index.html and http://www.eportcms.equifax.com/cs/Satellite?c=Content_C&childpagename=ePort2/EP2Layout &cid=1164343824872&pagename=EP2Wrapper &rendermode=preview >.

American Demographics: Credit-card mania [online], 6 pgs. [retrieved from the internet on Aug. 1, 2007 using <URL http://findarticles.com/p/articles/mi_m4021/is_n12_v18/ai_18894250/print.pdf>.

* cited by examiner

Primary Examiner — Edward Chang
(74) Attorney, Agent, or Firm — Fish & Richardson P.C.

(57) ABSTRACT

Systems and methods for completing a real-time prescreen of the credit-worthiness of a current or prospective customer when the customer phones, engages in text-based online communication with, meets in person with, or in some way has contact with a customer service representative of a financial services institution, are provided, as are systems and methods for providing in real time to the customer, if the customer is determined through a real-time prescreen to be sufficiently credit worthy, an unsolicited credit card offer, or an unsolicited offer of another form of credit, from the financial services institution. Systems and methods for completing a real-time prescreen of the credit-worthiness of a current or prospective customer, or providing an unsolicited credit offer in real time to such a customer, are also provided when the customer's contact with a financial services institution is largely text-based online contact wherein a customer service representative need not act as an intermediary in customer communications with the financial services institution.

18 Claims, 9 Drawing Sheets

100 Platinum MasterCard:
+ Cash Rewards Platinum MasterCard
+ Complete Rewards Platinum MasterCard

OFFER ENTRY PAGE

OFFER RETRIEVAL  OFFER SUMMARY  FAQ  LOGOUT

NO RECORDS FOUND ON FILE

CAUTIONS
- DO NOT run the tool unless customer is on the phone.
- DO NOT offer to see if you can qualify the customer for, or get the customer, a credit card.
- DO NOT run the tool if customer asks for credit card and no existing offer is found; transfer to CSR at Ext 1-2345 for an application.
- INSURANCE ONLY - If address is APO/FPO or foreign, customer is not eligible to use card for 1st payment.

Offer Control  *110*
CUSTOMER NUMBER
| 000000257 | | Retrieve |

*120*

Customer Information

| First Name * | MI | Last Name * | Suffix | SSN * | DOB (MMDDYYYY) * |
| Iris | | Seagraves | | 557060608 | 11011976 |

Address Line 1 *
| 5221 NW 1st Street |

Address Line 2
| |

| City * | State * | | Zip * |
| Irvine | California | | 92720 |

For Military Personnel
○ International PCS   ○ Deployment or Domestic PCS   ○ NO

*130*

\* Required    | Submit | | Clear |

FIG. 1

200 Platinum MasterCard:
+ Cash Rewards Platinum MasterCard
+ Complete Rewards Platinum MasterCard

OFFER APPROVAL PAGE

OFFER SUMMARY  FAQ  LOGOUT

Offer was recently approved by system.

CUSTOMER NUMBER [000000257]  [Retrieve]

Customer Information

| First Name | MI | Last Name | Suffix | SSN | DOB |
|---|---|---|---|---|---|
| Iris | | Seagraves | | 557060608 | 11011976 |

Address Line 1: 5221 NW 1st Street
Address Line 2:

City: Irvine   State: California   Zip: 92720

MANDATORY - READ OFFER TO CUSTOMER _210_   CREATION DATE [07162007]

You've been pre-approved for a PLATINUM MASTERCARD with a limit of $2,000 and no annual fee. You'll get a 0% introductory Annual Percentage Rate (APR) for 6 months on balance transfers and convenience checks that you may use during the first 60 days. Plus you'll enjoy a regular low variable APR on all your other transactions, currently just 14.15%.
You qualify for either of two PLATINUM MASTERCARDs.

With our CASH REWARDS PLATINUM MASTERCARD you'll receive up to 1.25% cash back on purchases and, as an added bonus, we'll pay for your first $25 in purchases.

Or you can choose our COMPLETE REWARDS PLATINUM MASTERCARD which gives you one point for every dollar in purchases and no annual fee. You can redeem points for dollars off airline tickets, merchandise or cash back and you'll receive 2,500 bonus points with your first purchase.

_220_ ● Cash Rewards Platinum MasterCard       _225_ ○ Complete Rewards Platinum MasterCard Would you like to use this Credit Card for your first payment (and any uncollected charges)? _227_

If customer accepts Keep in mind that we do not charge a transaction fee on purchases, balance transfers, or convenience checks. On other cash advances, such as ATM and Teller cash advances, there is a 3% cash advance fee.

| Current Status | Status Date | Credit Card Limit | Prime Rate | APR (Purchases) | APR (Cash) |
|---|---|---|---|---|---|
| APPROVED | 07162007 | $2,000 | 8.25% | 14.15% | 14.15% |

[Accept]  [Pend]  [Not Extended]
  230     240      250

FIG. 2

| OFFER ACCEPTANCE PAGE | |
|---|---|
| *300* | OFFER SUMMARY  FAQ  LOGOUT |

CUSTOMER NUMBER: 000000257  [Retrieve]

Customer Information

| First Name | MI | Last Name | Suffix | SSN | DOB |
|---|---|---|---|---|---|
| Iris | | Seagraves | ▼ | 557060608 | 11011976 |

Credit Card Mailing Address ⸺ *305*

☑ Mailing address verification (MUST VERIFY)*

Address Line 1 ⸺ *307*
5221 NW 1st Street

Address Line 2

City *
Irvine

State *: California    Zip *: 92720    * Required

Is your physical address same as your mailing address? ● Yes  ○ No

OFFER INFORMATION ⸺ *310*  Creation Date: 07162007  Current Status: APPROVED  Status Date: 07162007

| Product Type | Credit Card Limit | Prime Rate | APR (Purchases) | APR (Cash) | Rewards Product |
|---|---|---|---|---|---|
| Platinum | $2,000 | 8.25% | 14.15% | 14.15% | Cash Rewards |

Payment Information

We can provide you the convenience of setting up your future payments on your new Cash Rewards Platinum MasterCard, and, by enrolling in an automatic payment plan today, you'll receive an additional $25 credit from Funds Bank when you accumulate an additional $25 in purchases.

Automatic Payment Plan ⸺ *320*
⸺ *325*
○ Account Balance    ● Regular Plan    ○ Extended Payment Plan    ○ None

Automatic Payment Date ⸺ *330*
● Semi-monthly:1st & 15th    ○ Specific settlement Day: [ ] 0 through 31    ○ No preference Customer No.: 0000000257    First or Full Payment: $ 26.00 ⸺   Uncollected Charges: $ [ ]
*335*                                              *337*

[Submit] ⸺ *340*

FIG. 3

OFFER CONFIRMATION PAGE

400        *110*        OFFER SUMMARY   FAQ   LOGOUT

CUSTOMER NUMBER [000000257] [Retrieve]

Customer Information — 120

| First Name | MI | Last Name | Suffix | SSN | DOB |
|---|---|---|---|---|---|
| Iris | | Seagraves | ▾ | 557060608 | 11011976 |

Credit Card Mailing Address — 305

☑ Mailing address verification (MUST VERIFY)*     Physical Address

| Address Line 1 | Alt Address Line 1 |
|---|---|
| 5221 NW 1st Street | |

| Address Line 2 | Alt Address Line 2 |
|---|---|
| | |

| City * | Alt City * |
|---|---|
| Irvine | |

| State * | Zip * | Alt State * | Alt Zip * |
|---|---|---|---|
| California ▾ | 92720 | ▾ | |

Is your physical address same as your mailing address? ○ Yes   ⦿ No     * Required

OFFER INFORMATION — 310

Creation Date: [07162007]   Current Status: [ACCEPT]   Status Date: [07162007]

| Product Type | Credit Card Limit | Prime Rate | APR (Purchases) | APR (Cash) | Rewards Product |
|---|---|---|---|---|---|
| Platinum | $2,000 | 8.25% | 14.15% | 14.15% | Cash Rewards |

Payment Information — 315

We can provide you the convenience of setting up your future payments on your new Cash Rewards Credit Card, and by enrolling in an automatic payment plan today, you'll receive an additional $25 credit when you accumulate an additional $25 in purchases from the Funds Bank.

Automatic Payment Plan — 320

○ Account Balance    ⦿ Regular Plan    ○ Extended Payment Plan    ○ None

Automatic Payment Date — 330

⦿ Semi-monthly: 1st & 15th    ○ Specific settlement Day: [ ] 01 through 31    ○ No preference Customer Number [0000000257]   First or Full Payment: $ [26.00]   Uncollected Charges: $ [ ]

[DONE] — 410

FIG. 4

REAL-TIME PRESCREENING FOR CREDIT OFFERS

CROSS-REFERENCE TO RELATED APPLICATIONS

This application is also related in subject matter to, and incorporates herein by reference each in its entirety the following U.S. patent applications of Table I, each application entitled "Comprehensive Online Loan Transactions," and each filed Dec. 30, 2005:

TABLE I

Applications for Comprehensive Online Loan Transactions

| Ser. No. | Attorney Docket No. | Applicant Reference No. |
|---|---|---|
| 11/322,498 | 68744-00064US01 | US-0064.01 |
| 11/322,775 | 68744-00064US02 | US-0064.02 |
| 11/323,202 | 68744-00064US03 | US-0064.03 |

This application is also related in subject matter to, and incorporates herein by reference each in its entirety the following U.S. patent applications of Table II, each application entitled "System, Program, and Method for Handling Different Transaction Types across Different Lines of Business," and each filed Dec. 30, 2005:

TABLE II

Applications for Transactions Types across Lines of Business

| Ser. No. | Attorney Docket No. | Applicant Reference No. |
|---|---|---|
| 11/323,409 | 68744-00074US01.01 | US-0074.01 |
| 11/322,938 | 68744-00074US01.02 | US-0074.02 |
| 11/323,143 | 68744-00074US01.03 | US-0074.03 |
| 11/322,808 | 68744-00074US01 | US-0074.04 |

This application also incorporates herein by reference each in its entirety the following U.S. patent applications related to technology for remotely depositing checks:

TABLE III

Applications for Remotely Depositing Checks

| Ser. No. | Appl. Ref. | Filed | Title |
|---|---|---|---|
| 11/321,025 | US-0038.01 | Dec. 29, 2005 | Remote Deposit of Checks |
| 11/321,027 | US-0038.02 | Dec. 29, 2005 | Remote Deposit of Checks |
| 11/320,998 | US-0038.03 | Dec. 29, 2005 | Remote Deposit of Checks |
| 11/591,131 | US-0038.04 | Oct. 31, 2006 | Remote Deposit of Checks |
| 11/591,014 | US-0151.01 | Oct. 31, 2006 | Systems and Methods for Remote Deposit . . . |
| 11/590,971 | US-0151.02 | Oct. 31, 2006 | Systems and Methods for Remote Deposit . . . |
| 11/591,247 | US-0151.03 | Oct. 31, 2006 | Systems and Methods for Remote Deposit . . . |
| 11/590,963 | US-0151.04 | Oct. 31, 2006 | Systems and Methods for Remote Deposit . . . |
| 11/591,025 | US-0151.05 | Oct. 31, 2006 | Systems and Methods for Remote Deposit . . . |
| 11/591,003 | US-0152.01 | Oct. 31, 2006 | Systems and Methods for Remote Deposit . . . |
| 11/590,974 | US-0152.02 | Oct. 31, 2006 | Systems and Methods for Remote Deposit . . . |
| 11/591,273 | US-0153.01 | Oct. 31, 2006 | Systems and Methods for Remote Deposit . . . |
| 11/591,262 | US-0154.01 | Oct. 27, 2006 | Systems and Methods for Clearing Negoti . . . |
| 11/591,227 | US-0154.02 | Oct. 31, 2006 | Systems and Methods for Clearing Negoti . . . |
| 11/591,261 | US-0154.03 | Oct. 31, 2006 | Systems and Methods for Clearing Negoti . . . |
| 11/590,998 | US-0155.01 | Oct. 31, 2006 | Systems and Methods for Displaying Neg . . . |
| 11/591,228 | US-0155.02 | Oct. 31, 2006 | Systems and Methods for Displaying Neg . . . |
| 11/591,320 | US-0155.03 | Oct. 31, 2006 | Systems and Methods for Displaying Neg . . . |
| 11/686,930 | US-0158.01 | Mar. 15, 2007 | Systems and Methods for Verification of R . . . |
| 11/686,922 | US-0158.02 | Mar. 15, 2007 | Systems and Methods for Verification of R . . . |
| 11/686,924 | US-0158.03 | Mar. 15, 2007 | Systems and Methods for Verification of R . . . |
| 11/686,928 | US-0159.01 | Mar. 15, 2007 | Systems and Methods for Check Represent . . . |
| 11/686,925 | US-0159.02 | Mar. 15, 2007 | Systems and Methods for Check Represent . . . |
| 11/686,926 | US-0159.03 | Mar. 15, 2007 | Systems and Methods for Check Represent . . . |

This application is related in subject matter to, and incorporates herein by reference each in its entirety the following: U.S. patent application Ser. No. 11/859,150 entitled "Real-time Prescreening for Credit Offers," (Applicant Reference No. US-0301.02), filed on the same date as this application; and U.S. patent application Ser. No. 11/859,160 entitled "Real-time Prescreening for Credit Offers," (Applicant Reference No. US-0301.03), also filed on the same date as this application.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

Disclosed embodiments relate generally to systems and methods for completing a real-time prescreen of the credit-worthiness of a current or prospective customer. The real-time prescreen may be associated with the customer phoning, engaging in text-based online communication with, meeting in person with, or in some way having contact with a customer service representative (CSR) of a financial services institution. Disclosed embodiments also relate generally to systems and methods for providing in real time to the customer, if the customer is determined through a real-time prescreen to be sufficiently credit-worthy, an unsolicited credit card offer, or an unsolicited offer of another form of credit, from the financial services institution. Disclosed embodiments further relate generally to systems and methods for completing a real-time prescreen of the credit-worthiness of a current or prospective customer, or providing an unsolicited credit offer in real time to such a customer, when the customer's contact with a financial services institution is largely text-based online contact. In these further embodiments, a CSR need not act as an intermediary during a customer's text-based online contact with the financial services institution.

BACKGROUND

Before extending an unsolicited offer of credit, such as for a credit card, to a current or prospective customer, a financial services institution typically completes a prescreen to assess the credit-worthiness of the customer. Although a financial services institution may rely solely on its own resources in completing a prescreen, almost all financial services institutions use one of three consumer credit reporting agencies—EQUIFAX®, EXPERIAN®, and TRANSUNION® consumer credit reporting agencies—in completing a prescreen. Each of these three agencies operates consumer credit databases with many products and scoring models. EQUIFAX® databases contain information on more than 400 million credit holders worldwide (about three-quarters of whom are consumers), EXPERIAN® databases store credit information on 215 million consumers in the United States, and TRANSUNION® databases maintain credit histories of more than 500 million people in nearly 35 countries. Credit scoring differs from one lender to another, and at least some of the differences between lenders often may be traced to differences between or within the three major consumer credit reporting agencies in the scoring models that each agency uses.

A financial services institution may need to provide a consumer credit reporting agency only simple customer-identifying information—such as one or more of a customer's name, address, social security number, and date of birth—in order for the consumer credit reporting agency to pull data on that customer and complete its portion of a prescreen. After obtaining a credit report on the customer from a consumer credit reporting agency (or before obtaining the credit report, if the financial services institution has the needed data), the financial services institution may apply pre-qualifying criteria for assessing whether to extend an unsolicited offer of credit to the customer. These criteria may include: a) no bankruptcies in the past seven years; b) no major credit derogatories in the last 24 months; c) no late mortgage payments in the last 12 to 24 months; and d) a middle FICO or Fair Isaac Corporation score greater than or equal to 630. Other various sets of these kinds or other kinds of pre-qualifying criteria may apply.

If the credit report and any pre-qualifying criteria indicate that the current or prospective customer has sufficient credit-worthiness, the financial services institution may extend an unsolicited firm offer of credit, such as for a credit card, to the customer. However, the customer may either refuse the firm offer of credit, or, if the customer accepts the firm offer of credit, minimally use the corresponding credit instrument. The customer may make any of several decisions in the period between (A) "Prescreen Initiation," and (B) "Customer Receipt of Credit Instrument" that may lead the customer either to refuse the firm offer of credit, or, if the customer accepts the firm offer of credit, minimally to use the credit instrument. In particular, the financial services institution runs a risk of a losing a business opportunity in this period if this period is an extended one, e.g., measurable in terms of a day or more rather than seconds or minutes. As described herein further below, this disclosure provides systems and methods to mitigate this risk of losing business by providing real-time prescreening and, in some embodiments, nearly simultaneous offers of credit.

SUMMARY

Disclosed embodiments relate generally to systems and methods for completing a real-time prescreen of the credit-worthiness of a current or prospective customer. The real-time prescreen may be associated with the customer phoning, engaging in text-based online communication with, meeting in person with, or in some way having contact with a customer service representative (CSR) of a financial services institution. Disclosed embodiments also relate generally to systems and methods for providing in real time to the customer, if the customer is determined through a real-time prescreen to be sufficiently credit-worthy, an unsolicited credit card offer, or an unsolicited offer of another form of credit, from the financial services institution. Disclosed embodiments further relate generally to systems and methods for completing a real-time prescreen of the credit-worthiness of a current or prospective customer, or providing an unsolicited credit offer in real time to such a customer, when the customer's contact with a financial services institution is largely text-based online contact. In these further embodiments, a CSR need not act as an intermediary during a customer's text-based online contact with a financial services institution. Furthermore, an unsolicited offer of credit to a customer whom a prescreen has determined has sufficient credit-worthiness may include more than a single credit card offer, or an offer for a single credit product, but the unsolicited offer of credit may include a suite of products tailored to the customer.

Disclosed embodiments are directed to system and method for, as well as related computer-readable medium for, real-time processing of credit information of a customer, wherein the system comprises a network; and a computing system connected to said network, said computing system configured to: receive a customer number for said customer, retrieve customer information associated with the customer number; submit the customer information to a network-linked service providing real-time credit prescreens; receive in real time a credit approval from the network-linked service; and present in real time to a user interface a credit offer for the customer in view of the credit approval.

Disclosed embodiments are also directed to system and method for, as well as related computer-readable medium for, real-time processing of credit information of a customer in screening for receipt by the customer of a product or service, the system comprising: a network; and a computing system connected to said network, said computing system configured to: receive customer information for identifying the customer; submit the customer information to a network-linked service providing real-time credit prescreens; receive in real time an indicator of customer credit-worthiness from the network-linked service; and present in real time to a user interface an offer for a product or service for the customer in view of the indicator of customer credit-worthiness received from the network-linked service.

Disclosed embodiments are also directed to system and method for, as well as related computer-readable medium for, real-time processing of credit information of a customer in screening for receipt by the customer of at least two credit offers, the system comprising: a network; and a computing system connected to said network, said computing system configured to: receive customer information for identifying the customer; submit the customer information to a network-linked service providing real-time credit prescreens; receive in real time an indicator of customer credit-worthiness from the network-linked service; and present in real time to a user interface two or more credit offers for the customer in view of the indicator of customer credit-worthiness received from the network-linked service.

BRIEF DESCRIPTION OF THE DRAWINGS

The foregoing and other advantages will become apparent from the following detailed description and upon reference to the drawings, wherein:

FIG. 1 illustrates a screenshot of an Offer Entry Page as seen by a CSR of the financial services institution;

FIG. 2 illustrates a screenshot of an Offer Approval Page as seen by a CSR;

FIG. 3 illustrates a screenshot of an Offer Acceptance Page as seen by a CSR;

FIG. 4 illustrates a screenshot of an Offer Confirmation Page as seen by a CSR;

DETAILED DESCRIPTION

Figure 5:
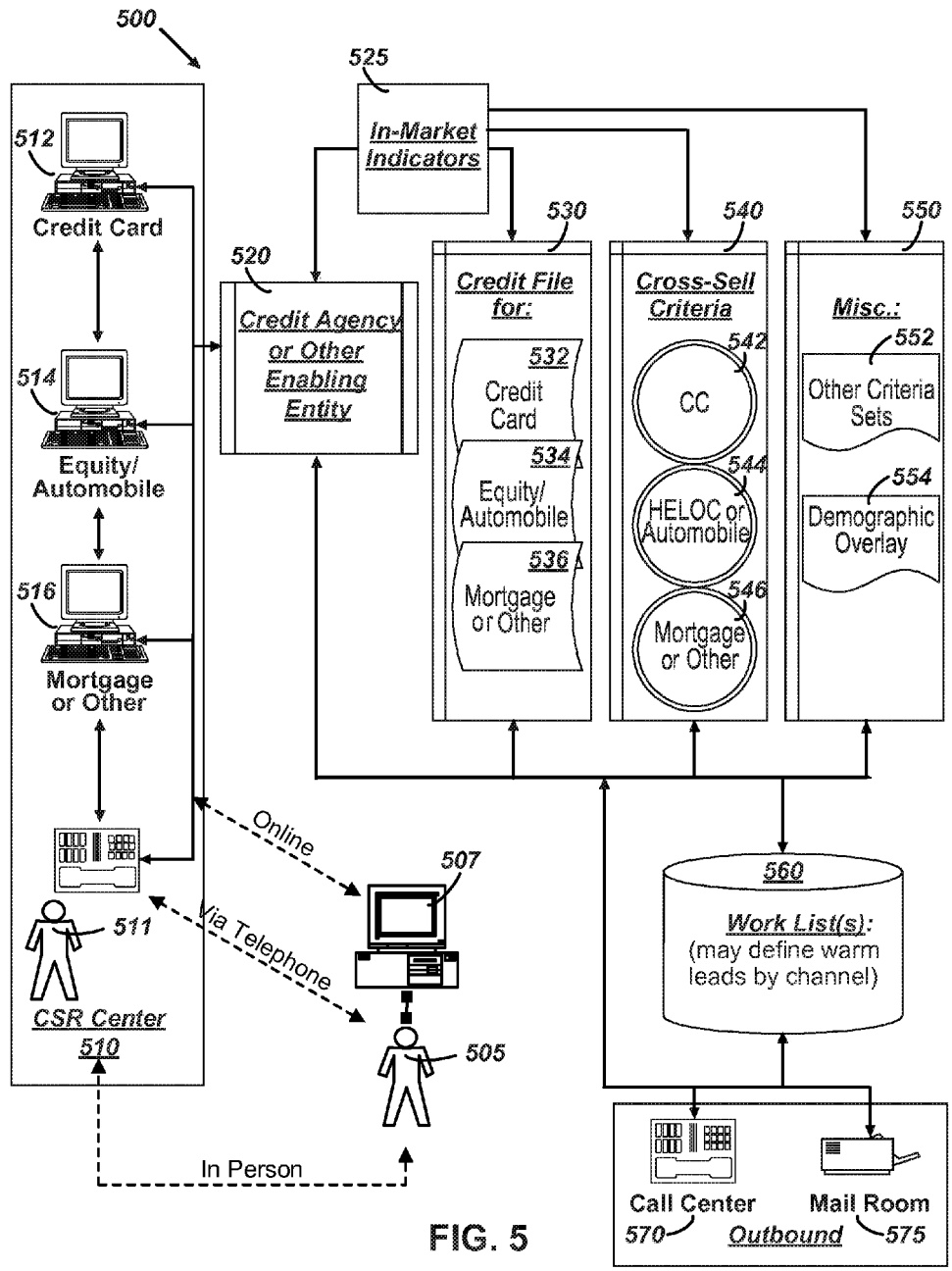
FIG. 5 illustrates data flow in one embodiment of a system for real-time prescreening for credit offers.

Following is a detailed description with reference to the drawings wherein the same reference labels are used for the same or similar elements. As used throughout this description and the claims, the terms "a" and "an" are intended to mean "one or more." An institution, as used herein, is a general term and does not exclude any type of organization, company, entity, group, cooperative, affiliation, partnership, or corporation. An institution, as used herein, may comprise a plurality of smaller institutions, companies, divisions, subdivisions, wholly- or partially-owned subsidiaries, affiliates, or any other entity for conducting business that is related, by ownership, management, and/or structure, to the institution.

Referring to FIG. 1, when a current customer meets in person with, places a call to, engages in text-based online communication with, or in some way makes contact with, a financial services institution, a human or automated call-receiving service may ask the current customer to enter his or her customer number 110 into a system of the financial services institution, e.g., via a touchtone phone option. In some embodiments, the customer is transferred, either by phone or in person, to a CSR of the financial services institution. If the customer is not capable of entering, or simply does not enter, his or her customer number before communicating with the CSR, the CSR may request the customer number of the customer, and then the CSR may enter that customer number into the system of the financial services institution for the customer. In some embodiments, the customer number entered could actually be the customer number of the caller's spouse or, if not the customer number of the caller's spouse, the customer number of a person of similar legal or financial relationship as a spouse to the caller.

In some embodiments, the system of the financial services institution then displays on a monitor screen for the CSR additional data like the customer information 120 that is displayed on Offer Entry Page 100 of FIG. 1. The system has retrieved into Offer Entry Page 100 customer information comprising the customer's name (Iris Seagraves), address (5221 NW 1st Street, Irvine, Calif. 92720), SSN or social security number (557060608), and DOB or date of birth (11011976 or Nov. 1, 1976). These fields or categories of information are often required in order for the CSR to have a prescreen run on the customer in order to see if the customer qualifies for a credit offer such as an offer for a Cash Rewards Platinum MasterCard or a Complete Rewards Platinum MasterCard of the financial services institution.

In some embodiments, if the caller is a prospective customer (and not a current customer), the caller is likely nonetheless to need a customer number. The CSR may obtain customer information from the prospective customer and then provide to the prospective customer a customer number that the financial services institution has generated for, and assigned to, this new customer. The customer number may be a temporary one. For either a current customer or a prospective-turned-new customer, the customer information—such as name, address, social security number, and date of birth—may be generally associated with, or tied to, the customer number.

In some embodiments, as described later herein in more detail, all or part of the customer information may be retrieved in real time from a system of the financial services institution. The customer information also may be retrieved in real time at least in part from a system of a consumer credit reporting agency to which the financial services institution subscribes. The EQUIFAX EPORT® system is an example of a system to which a financial services institution may subscribe, and some services within the EQUIFAX EPORT® system—for example, the OFAC Alert™ system, wherein "OFAC" is an acronym for the Department of Treasury's Office of Foreign Assets Control—may be capable of accessing additional customer information by searching EQUIFAX records using simply the customer's name and address. In other embodiments, a financial services institution may also make use of other enabling technologies of a consumer credit reporting agency or other third-party vendor such as the EQUIFAX APPLY™ enabling technology for accessing additional customer information.

In some embodiments, after having received or obtained data for customer information fields of Offer Entry Page 100, the CSR may select Submit button 130 in order to initiate a real-time prescreen of the customer. The real-time prescreen may determine, for example, if the customer has sufficient credit-worthiness to qualify for an unsolicited offer of a credit card or another form of credit from the financial services institution. The financial services institution may subscribe to a consumer credit reporting agency not only for a service that provides additional customer information but also for a service that provides such real-time prescreens, such as the EQUIFAX EPORT® system or another EQUIFAX® system with EQUIFAX APPLY™ enabling technology. Other examples of such services to which a financial services institution may subscribe exist for other consumer credit reporting services. On initiating the real-time prescreen, the CSR need not inform the customer of the prescreen. In many embodiments, the financial services institution may instruct the CSR not to inform the customer of the prescreen.

Referring to FIG. 2, if the result of the real-time prescreen from a service providing real-time credit prescreens is that the customer does not qualify for a credit card or another form of credit, Offer Approval Page 200 or a similar approval page may not be displayed. In such case, the CSR may not need to complete other actions in determining whether the customer has sufficient credit-worthiness—the customer simply would not qualify for an unsolicited credit card offer. If, as in many embodiments, the customer had not been informed of the prescreen, the customer could not be disappointed in the "no credit approval" outcome of the prescreen because the customer would not know that the CSR had initiated a prescreen to determine whether the customer had sufficient credit-worthiness.

In some embodiments, Offer Approval Page 200 is displayed for the CSR only if the customer is approved for a credit card. If the customer were approved for another form of credit other than a credit card, an Offer Approval Page similar to Offer Approval Page 200 may be displayed for the CSR for that other form of credit. If the customer is approved for a Platinum MasterCard (as indicated on Offer Approval Page 200), the CSR representative may read an offer like the one noted under heading 210 "MANDATORY—READ OFFER TO CUSTOMER," as follows:

"You've been pre-approved for a PLATINUM MASTER-CARD with a limit of $2,000 and no annual fee. You'll get a 0% introductory Annual Percentage Rate (APR) for 6 months on balance transfers and convenience checks that you may use during the first 60 days. Plus you'll enjoy a regular low variable APR on all your transactions, currently just 14.15%. You qualify for either of two PLATINUM MASTERCARDs.

With our CASH REWARDS PLATINUM MASTER-CARD you'll receive up to 1.25% cash back on purchases and, as an added bonus, we'll pay for your first $25 in purchases.

Or you can choose our COMPLETE REWARDS PLATINUM MASTERCARD which gives you one point for every dollar in purchases and no annual fee. You can redeem points for dollars off airline tickets, merchandise or cash back and you'll receive 2,500 bonus points with your first purchase."

If the customer accepts the offer, the CSR may ask the customer to choose a Cash Rewards Platinum MasterCard or a Complete Rewards Platinum MasterCard. If the customer chooses the Cash Rewards Platinum MasterCard, the CSR may select corresponding option circle 220 on Offer Approval Page 200. If the customer chooses the Complete Rewards Platinum MasterCard, the CSR may select corresponding option circle 225 on Offer Approval Page 200. The CSR may then inform the customer of other features of the credit card such as those also noted on Offer Approval Page 200 following "If customer accepts":

"Keep in mind that we do not charge a transaction fee on purchases, balance transfers, or convenience checks. On other cash advances, such as ATM and Teller cash advances, there is a 3% cash advance fee."

The CSR may then select "Accept" button 230 on Offer Approval Page 200 to continue the process of opening the Cash Rewards Platinum MasterCard account for the customer.

In some embodiments, if the customer expresses a desire to "think about the offer," the CSR may select "Pend" button 240. Similarly, if the customer rejects the oral offer, the CSR then may also select "Pend" button 240 in view of a firm credit card offer in writing that the financial services institution must later mail to the customer. But if the CSR did not have an opportunity while conversing with the customer to extend a credit card offer even though the determination of the real-time credit prescreen was that the customer was credit-worthy and qualified to receive an unsolicited credit card offer, the CSR may then select "Not Extended" button 250. In view of having run a prescreen on the customer, the financial services institution is legally required, if the customer qualifies for a credit card offer, to send a firm offer in writing for a credit card to the customer. Accordingly, the financial services institution then schedules a time to send the firm offer in writing for a credit card to the customer. The financial services institution may run also a second prescreen on the customer at a later time.

In some embodiments, not only is the running of a pre-screen on a customer, the generation of an unsolicited offer of credit for the customer, and the acceptance of a credit card offer by the customer all accomplished in real time (e.g., in one call), but the CSR may, as described further below, be able to provide to the customer a credit card account number and corresponding security code(s) in the same call (i.e., in a nearly simultaneous way). The customer could then use his or her new credit card account number to make other purchases even though the customer may not yet receive for a day or more via postal delivery a typical plastic card bearing the credit card account number both invisibly in a magnetic strip on the back of the card and visibly in embossed letters on the card. More usually, the customer may simply elect to have an insurance premium, or a payment for another product (e.g., auto insurance) that the customer was in the process of purchasing from the financial services institution applied to his or her new credit card account. It is to the purchase of another product that sentence 227 [i.e., "Would you like to use this Credit Card for your first payment (and any uncollected charges)?"] on Offer Approval Page 200 applies.

Referring to FIG. 3, if the customer accepts from the CSR the offer for a credit card and the CSR then selects Accept button 230 on Offer Approval Page 200, Offer Acceptance Page 300 of FIG. 3 is then displayed for the CSR on a screen monitor. In some embodiments, the CSR may then verify the mailing address of the customer to whom the financial services institution is to send the typical plastic card version of the credit card, statements detailing use of the credit card account, and related mailings. On verifying this mailing address under heading 305 "Credit Card Mailing Address," the CSR may select option square 307 "Mailing address verification (MUST VERIFY)." The CSR may also review again with the customer credit card offer details—as noted under heading 310 "OFFER INFORMATION."

In some embodiments, the financial services institution is a comprehensive integrated financial services institution that offers not only credit services, but also other financial services such as insurance services, other banking services (through, e.g., a "Funds Bank"), investment services, and the like. Accordingly, the CSR may have, in the course of the same call with the customer, previously sold the customer a new insurance policy (e.g., as discussed in more detail later, an auto insurance policy; in fact, the customer may have initially phoned, or in some other way contacted, the comprehensive integrated financial services institution in order to inquire about, or purchase, an insurance policy or some other product offered by the comprehensive integrated financial services institution). The CSR may then offer to set up payments for the new insurance policy on the new credit card account that the customer has recently accepted (e.g., the Cash Rewards Platinum MasterCard account), and, as noted under heading 315 "Payment Information," the CSR may say to the customer:

"We can provide you the convenience of setting up future payments on your new Cash Rewards Platinum Master-Card, and, by enrolling in an automatic payment plan today, you'll receive an additional $25 credit from Funds Bank when you accumulate an additional $25 in purchases."

The customer may then accept to set up with the CSR future payments for the insurance policy on the customer's new Cash Rewards Platinum MasterCard. In the course of reviewing various payment plan options with the CSR, the customer may agree to a "Regular Plan" of automatic payment. If so, the CSR would select "Regular Plan" option circle 325 under heading 320 "Automatic Payment Plan."

Similarly, the customer may agree that, among the options under heading 330 "Automatic Payment Date," a semi-monthly option of having premium amounts billed to the credit card account on the 1st and 15th of each month is the best payment option in the customer's view. If so, the CSR would select the "Semi-monthly: 1st and 15th" option circle 335 under heading 330 "Automatic Payment Date." After entering the "First or Full Payment" amount at box 337 (e.g., a first semi-monthly premium dollar amount of "26.00"), the CSR may select "Submit" button 340 in order to continue to set up on a system of the comprehensive integrated financial services institution the customer's new Cash Rewards Platinum MasterCard account and future payments from that account for the customer's new insurance policy.

Referring to FIG. 4, Offer Confirmation Page 400 is then displayed on a monitor screen for the CSR, who may then confirm with the customer the accuracy of data entries on the page, including those of Customer Number 110, Customer Information 120, Credit Card Mailing Address 305, Offer Information 310, Automatic Payment Plan 320, and Automatic Payment Date 330. The CSR may then select "Done" button 410 in order to set up on a system of the comprehensive integrated financial services institution the customer's new Cash Rewards Platinum MasterCard account as well as future payments from that account for the customer's new insurance policy.

As exemplified in FIGS. 1 through 4, embodiments disclosed herein may allow a financial services institution in real time or in a nearly simultaneous way (e.g., during one call of a customer to a CSR of the financial services institution) to complete acts of establishing a credit account (e.g., a credit card account). In particular, embodiments disclosed herein may allow a financial services institution in real time to: 1) prescreen a customer for credit-worthiness, 2) generate an unsolicited offer of credit for the customer (e.g., if the pre-screen determines the customer is sufficiently credit-worthy), and, 3) if the customer immediately accepts the unsolicited offer of credit, provide to the customer a credit instrument [e.g., in some embodiments, a credit card account number and corresponding security code(s)]. On the same call, the financial services institution may offer to the customer the opportunity to: 4) make other purchases, for example, of an insurance product or another product (e.g., if the financial services institution is a comprehensive integrated financial services institution that offers not only credit services, but also other financial services such as insurance services, other banking services, investment services, and the like) using the credit that is now available to the customer on his or her new credit account. In some embodiments, the financial services institution may also sell, e.g., through a subsidiary or an affiliate, consumer goods, jewelry, business or housing supplies, or other personal or real property, and the customer may purchase these using credit from his or her new credit account.

Because embodiments disclosed herein allow a financial services institution to accomplish these acts in real time or in a nearly simultaneous way, the financial services institution may mitigate the risk of losing business because of any of several decisions a customer may make over a period from (A) "Prescreen Initiation" to (B) "Customer Receipt of Credit Instrument" where that period is considerable, e.g., measurable in terms of a day or more rather than seconds or minutes. In particular, the period from (A) "Prescreen Initiation" to (B) "Customer Receipt of Credit Instrument" may be marked by interim time points (A2) "Customer Receipt of Firm Offer" and (A3) "Customer Acceptance of Firm Offer," as follows:

| A | A2 | A3 | B |
|---|---|---|---|
| Prescreen Initiation | Customer Receipt of Firm Offer | Customer Acceptance of Firm Offer | Customer Receipt of Credit Instrument |

Embodiments disclosed herein allow a financial services institution to mitigate the risk of losing business because of any of several decisions a customer may make over extended periods from (A) "Prescreen Initiation" to (A2) "Customer Receipt of Firm Offer," to (A3) "Customer Acceptance of Firm Offer," to (B) "Customer Receipt of Credit Instrument."

For example, in prior art systems and methods the period from (A) "Prescreen Initiation" to (A2) "Customer Receipt of Firm Offer" has been considerable because of the time a financial services institution may spend both in completing a competitively adequate prescreen on the credit-worthiness of the customer and in then actually extending to the customer an unsolicited firm offer of credit. The period from (A2) "Customer Receipt of Firm Offer" to (A3) "Customer Acceptance of Firm Offer" has been considerable not only because of time spent by the customer deliberating about the offer, but also because of manual steps typically required of a customer to accomplish an acceptance of the firm offer. The period from (A3) "Customer Acceptance of Firm Offer" to (B) "Customer Receipt of Credit Instrument" has been considerable because of the time a financial services institution may spend both in assembling documents associated with opening a new account for a credit instrument and then in delivering that credit instrument (e.g., a credit card) to the customer. In particular, manual data transfers or manual document handling actions in prior art systems and methods have made the overarching period from (A) "Prescreen Initiation" to (B) "Customer Receipt of Credit Instrument" generally to be considerable, i.e., measurable in terms of a day or more rather than seconds or minutes.

Embodiments disclosed herein allow a financial services institution to mitigate risks of losing business that may be attributable to the length of this overarching period or of component periods. For example, the risk of a customer accepting a competing offer of credit during the period from (A) "Prescreen Initiation" to (B) "Customer Receipt of Credit Instrument" may be mitigated. Records indicate that each year credit card companies mail about five billion credit card offers to 200 million individuals in the United States. That is, most Americans will receive a credit card offer on average every other week. With this frequency of credit card offers in the United States, a customer has a reasonable chance, in the period from (A) "Prescreen Initiation" to (B) "Customer Receipt of Credit Instrument," of receiving, and accepting, a credit card offer from a competing financial services institution.

Referring to FIG. 5, customer 505 may contact CSR Center 510 of system 500 in person. Customer 505 may also contact CSR Center 510 by phone and/or through text-based online communications. The expertise or database access rights of a CSR (e.g., CSR 511; several or many CSRs like CSR 511 may staff CSR Center 510) may be for one or more various areas. The focus of one CSR may be in a credit card area 512, the focus of another CSR may be in a home equity or automobile loan area 514, and the focus of another CSR may in a mortgage or other loan area 516. In some embodiments, a customer who goes in person to, calls, logs-in to a online system of, or in some way makes contact with, a financial services institution, particularly a comprehensive integrated financial services institution, may be transferred or directed to a CSR of CSR center 510 who has expertise and database access rights in one of these credit-related areas by an employee of another service area (such as an insurance service or investment service area) of the financial services institution.

In some embodiments, CSR Center 510 is, or is part of, a blended contact center for an institution, such as a financial services institution, in which a customer may initiate a transaction in one line of the institution's business (e.g., insurance) and is provided with an opportunity to complete a transaction in another line of the institution's business (e.g., banking). A blended contact center need not be a single physical entity that is geographically concentrated and may be located in a single location or may be distributed across a plurality of locations. In each of the U.S. patent applications of previously noted Table II "Applications for Transaction Types across Lines of Business," a blended contact center is further detailed, and each of these applications is again incorporated herein by reference in its entirety.

In various aspects, the blended call center could comprise one or more individuals cross-trained, to various degrees, in multiple lines of business. The cross-training may comprise complete cross-training and permit an agent or CSR to provide complete service in two or more lines of business. The cross-training may also be partial and permit an agent or CSR simply to provide some, possibly commonly requested services in a second, third, fourth, etc. area(s) of training, but fall short of being able to provide every potential requested service in such categories. By enabling a customer to experience a "one and done" or "one-stop shopping" environment, a blended contact center generally provides an improved customer experience, reduces the frequency of contacts required from a customer, and yet generally increases the number of institution products per household.

In some embodiments, communications between a customer and a CSR of CSR Center 510 are partially or completely without reliance on voice communications, but partially or completely rely on real-time, text-based communications. In addition to communicating with a customer in real time, a CSR may communicate and exchange data in real time with systems of a consumer credit reporting agency or some other enabling entity 520, which in real time may access data included in a credit file or record 530 having as an area of focus accounts for credit cards 532, home equity or automobile loans 534, or mortgages or other loans or products 536. The consumer credit reporting agency or the other enabling entity of the "consumer credit reporting agency or some other enabling entity" 520, or both, may be affiliated with, or be part of, the financial services institution, or either or both may be separate from the financial services institution. Furthermore, credit files or records 530 may additionally include related or unrelated insurance and investment records, or other financial records.

In some embodiments, a consumer credit reporting agency or some other enabling entity 520 may also in real time access data records on cross-selling criteria or factors 540 wherein a focus is on cross-selling credit offers in the form of credit cards (CC) 542, home-equity lines of credit (HELOC) or automobile loans 544, or mortgages or other loans or products 546. Similarly, a consumer credit reporting agency or some other enabling entity 520 may also in real time access data from miscellaneous records 550 that include demographic overlay data 554 or data based on sets of criteria 552 in addition to those found in credit files or records 530 or records on cross-selling criteria or factors 540. Data on in-market indicators 525 relevant to customers or related parties may be added to data sent from a consumer credit reporting agency or some other enabling entity 520 to a credit file or record 530, a record on cross-selling criteria or factors 540, or a miscellaneous record 550. Similarly, data on in-market indicators 525 may be added to data sent in the opposite direction, i.e., from a credit file or record 530, a record on cross-selling criteria or factors 540, or a miscellaneous record 550 to a consumer credit reporting agency or some other enabling entity 520.

In some embodiments, work lists of potential customers who may be good candidates or warm leads for offers of credit may be assembled from data in credit files or records 530, records on cross-selling criteria or factors 540, or miscellaneous records 550, and then stored in a work list database 560. A work list of warm leads for offers that are to be extended by telephone may be forwarded to outbound call center 570. Similarly, a work list of good candidates or warm leads for offers that are to be extended by mail may be forwarded to outbound mail room or house 575. Both call center 570 and mail room or house 575 may provide feedback data—e.g., updated telephone numbers and addresses, respectively, of potential customers—for work list database 560, as well as for a consumer credit reporting agency or some other enabling entity 520 and credit files or records 530, records on cross-selling criteria or factors 540, or miscellaneous records 550 accessible to the consumer credit reporting agency or some other enabling entity 520.

In some embodiments, customer 505 may contact CSR Center 510 in person, via telephone, largely through text-based online communications, e.g., through personal computer 507, or in some other way. Customer 505 may be interested in a home-equity line of credit, an automobile loan, a mortgage, or some other loan, bank product, or other product of the financial services institution (e.g., an insurance product if the financial services institution is a comprehensive integrated financial services institution that offers a full spectrum of insurance products). In communicating with customer 505, a CSR of CSR Center 510 may then run a real-time prescreen to determine the credit-worthiness of the customer as noted above in description for FIGS. 1 to 4. If the prescreen determines that the customer qualifies for an unsolicited offer of credit, the CSR may arrange to have the customer receive in a nearly simultaneous way a firm offer for such credit (e.g., an offer for a credit card as also noted above in description for FIGS. 1 to 4).

In some embodiments, a CSR of CSR Center 510 may also use the results of a real-time prescreen (and, possibly, data available from credit files or records 530, records on cross-selling criteria or factors 540, or miscellaneous records 550) to provide customer 510 in a nearly simultaneous way with a firm offer of credit of another form, e.g., an auto loan, a home equity line of credit (HELOC) or home equity loan, a mortgage, etc. The CSR could also provide the customer with an opportunity to use the new credit account to purchase insurance (e.g., auto insurance, homeowners insurance, valuable personal property insurance, etc.) or another product of the financial services institution through a method, for example, similar to the methods noted above in the description supporting FIGS. 1 to 4, where a customer purchases insurance on a new credit card account. In many cases, the financial services institution may couple the credit offer with an offering of a suite of products and services that are tailored to the needs or interests of the customer. In some cases, the financial services institution would need to supplement the results of a pre-screen with other information (e.g., income information) about the customer in order for the financial services institution to offer in the suite some products and services—this would generally be the case, for example, if the financial services institution were to include an offer of a mortgage-type financial instrument among the suite of products and services.

In some embodiments, a financial services institution may include a real-time prescreen as part of a comprehensive online loan transaction to provide customer 510 in a nearly simultaneous way with a firm offer of credit for use in the purchase of an auto or another good or service as further detailed in the U.S. patent applications of previously noted Table I "Applications for Comprehensive Online Loan Transactions"; each of these applications is again incorporated herein by reference in its entirety.

In some embodiments, a real-time prescreen may be used to determine if a customer meets one of the criteria (i.e., a credit-worthiness criterion) for receiving a product or service, such as a software product or service. For example, a customer 505 might inquire of a CSR of CSR Center 510 about bank products. The CSR may use the occasion of the inquiry to run, with or without informing the customer, a real-time prescreen to determine whether the customer qualifies to receive software for participating in a bank service that enables a bank customer to deposit checks remotely using a home personal computer and a scanner (or another device for capturing a check image). One of the criteria for receiving the software may be that the customer must possess a certain level of credit-worthiness. If the results of the prescreen are that the customer does possess the required level of credit-worthiness (i.e., the prescreen returns an indicator of credit-worthiness for the customer, wherein the indicator of credit-worthiness may be a credit score above a certain minimum value from a consumer credit reporting agency), the CSR may inform the customer in real time that the customer qualifies to receive the software for participating in a bank service that enables a bank customer to deposit checks remotely using a home personal computer and a scanner (or another device for capturing a check image).

If customer 505 wishes to receive the software, the CSR may then bring about the delivery of the software to the customer. The delivery of the software product may be through a physical mailing of a memory device (e.g., a memory stick or optical or magnetic disks) through a postal service to the customer's mailing address verified at 307 of FIG. 3. However, delivery of the software may be an internet-based electronic delivery, for example, as an attachment to an email message sent by the financial services institution to an email address of customer 505. Internet-based electronic delivery may also be through a password-enabled download by customer 505 from a website sponsored or supported by the financial services institution.

If customer 505 is in online contact with the financial services institution (e.g., with CSR Center 510 via personal computer 507), electronic delivery of the software may also be in real time. A system of the financial services institution may simply provide customer 505 with a password for downloading the software on the same call wherein, as a result of the prescreen, the CSR informs the customer that he or she qualifies to receive the software for depositing checks remotely. A system of the financial services institution may also provide customer 505 with a voucher to obtain the software (or some other product or service to which the financial services institution may apply a required level of credit-worthiness in order for a customer to receive the product or service) from a distribution point sponsored by the financial services institution. As for delivery of software, delivery of the voucher to customer 505 may be through a physical mailing or via an electronic means.

The capabilities of technologies for remotely depositing checks are further detailed in each of the U.S. patent applications of previously noted Table III "Applications for Remotely Depositing Checks;" each of these applications is again incorporated herein by reference in its entirety.

Figure 6:
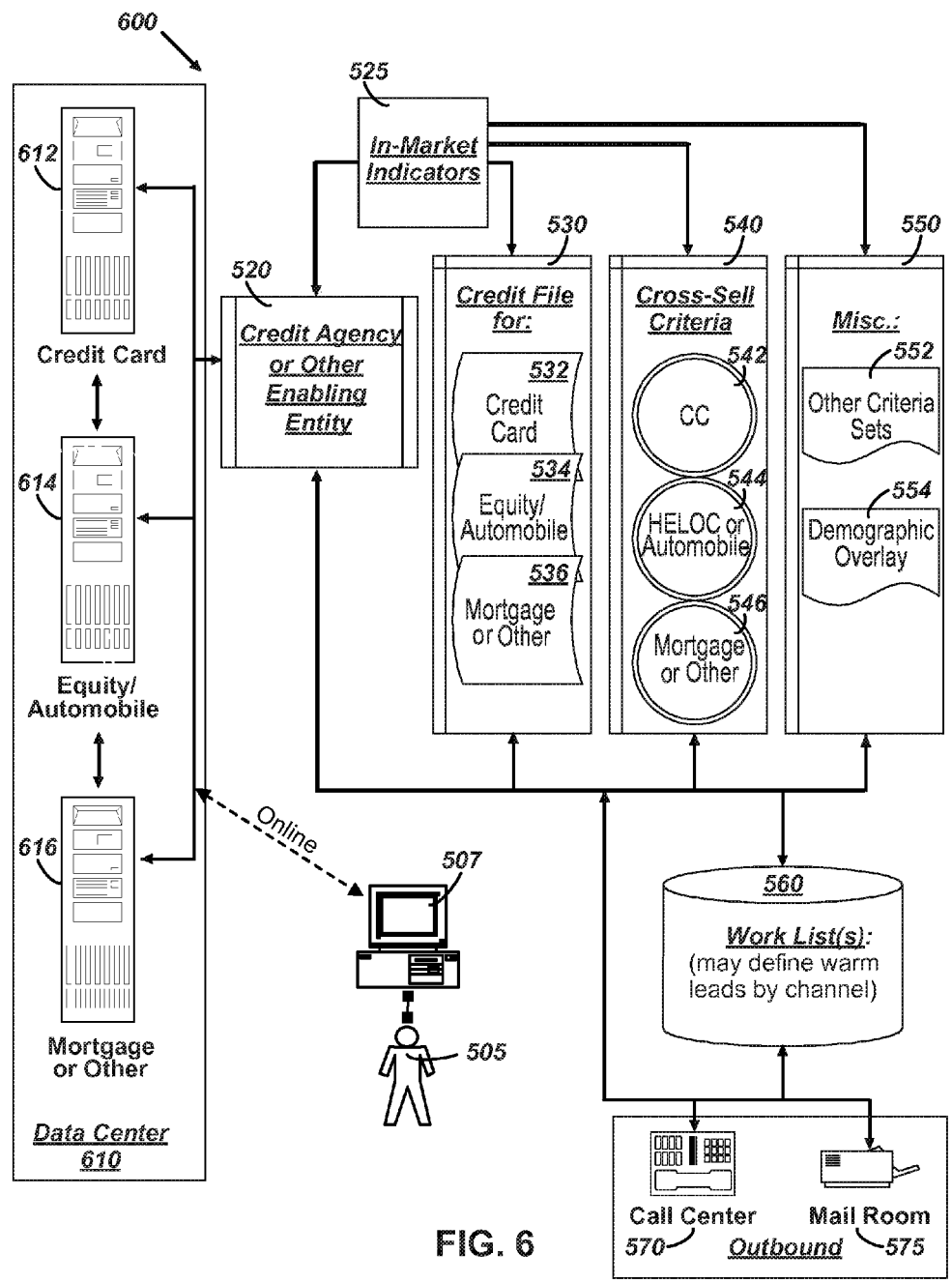
FIG. 6 illustrates data flow in another embodiment of a system for real-time prescreening for credit offers.

Referring to FIG. 6, customer 505 may contact system 600's Data Center 610 of a financial services institution simply through online communications, and through which customer 505 may interact with Data Center 610, at least optionally or in part, without the intervention or assistance of a human CSR. Data may be stored and processed through one or more servers of Data Center 610. Like CSRs of CSR Center 510, servers of Data Center 610 may have one or more various areas as a focus. For example, in some embodiments, the focus of data processed through server 612 may be in a credit card area, the focus of data processed through server 614 may be in a home equity loan or automobile loan area, and the focus of data processed through server 616 may be in a mortgage or other loan or product area. In some embodiments, servers may be distinguished not by data areas or types but by the operations that the server supports.

In some embodiments, Data Center 610 may support services to customers who interact with a financial services institution simply through online communications (i.e., without, at least optionally or in part, the intervention or assistance of a human CSR) and yet who, through the online tools and systems provided by the financial services institution, are able to accomplish objectives similar to those noted above in the description for FIGS. 1 to 5. For example, in one sitting before computer 507, customer 505 may obtain a new credit card account in real time simply through online interaction with Data Center 610 of a comprehensive integrated financial services institution (i.e., without the intervention or assistance of a human CSR), and customer 505 may then use that new credit card account to make a purchase of insurance in the same sitting simply through online interaction with Data Center 610 (i.e., again, without the intervention or assistance of a human CSR).

During the course of obtaining a new credit card account in real time simply through online interaction with Data Center 610, customer 505 may likely need to agree overtly to a credit check. Furthermore, the financial services institution may likely need to display to customer 505 disclosure material concerning terms and conditions for the new credit card account, but customer 505 could agree to these terms and conditions for the new account through an online process, e.g., an e-signature process. In other respects, other components illustrated in FIG. 6 as being associated with system 600's Data Center 610 through credit reporting agency or some other enabling entity 520 may support, or be supported by, system 600 in a manner similar to the way these other components, which are illustrated in FIG. 5 and described above as being associated with CSR Center 510, support, or are supported by, system 500.

Figure 7:
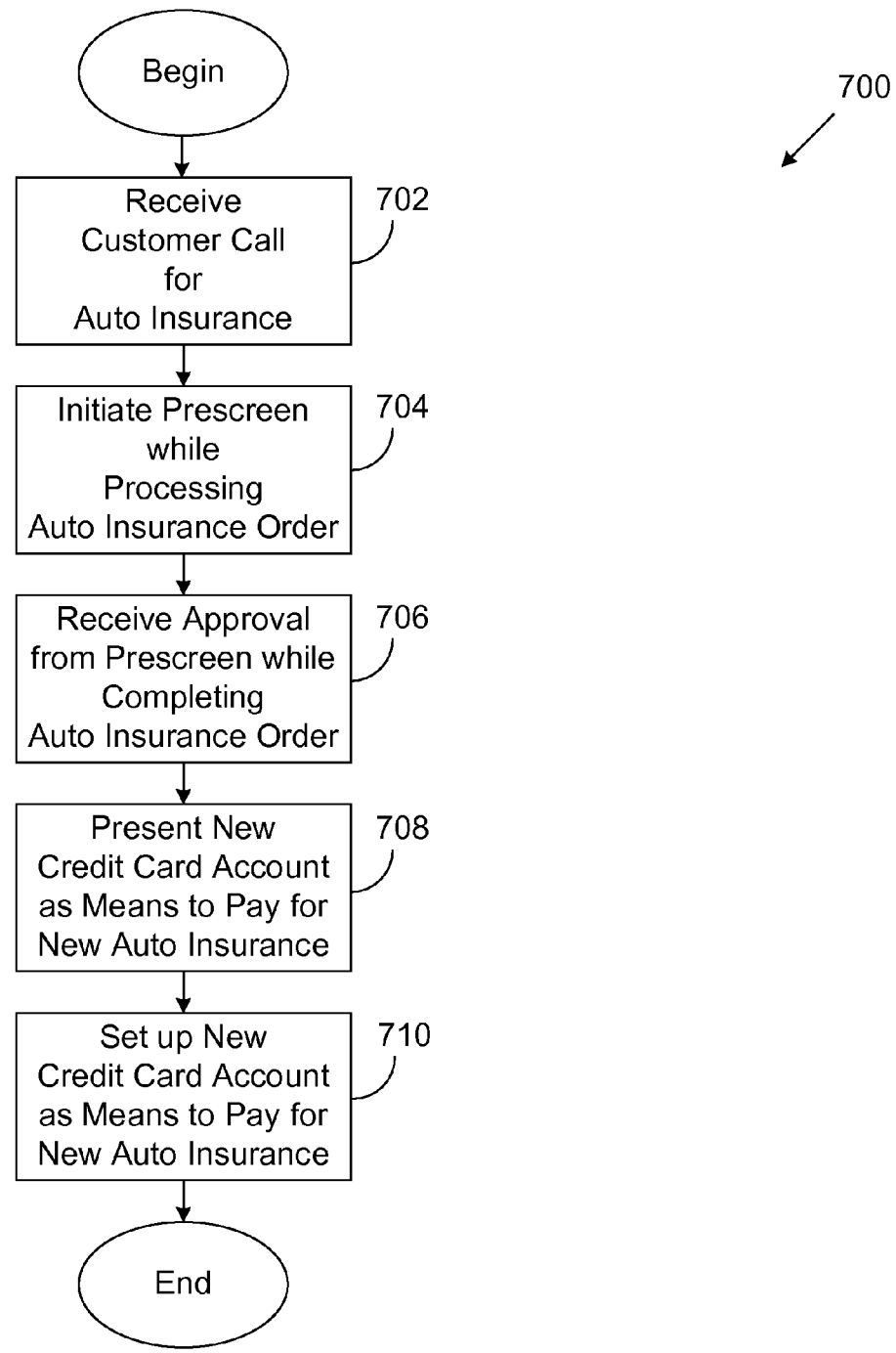
FIG. 7 illustrates a portion of an embodiment of an auto insurance purchase method that includes a real-time prescreen of a customer for a credit card offer.
Figure 8:
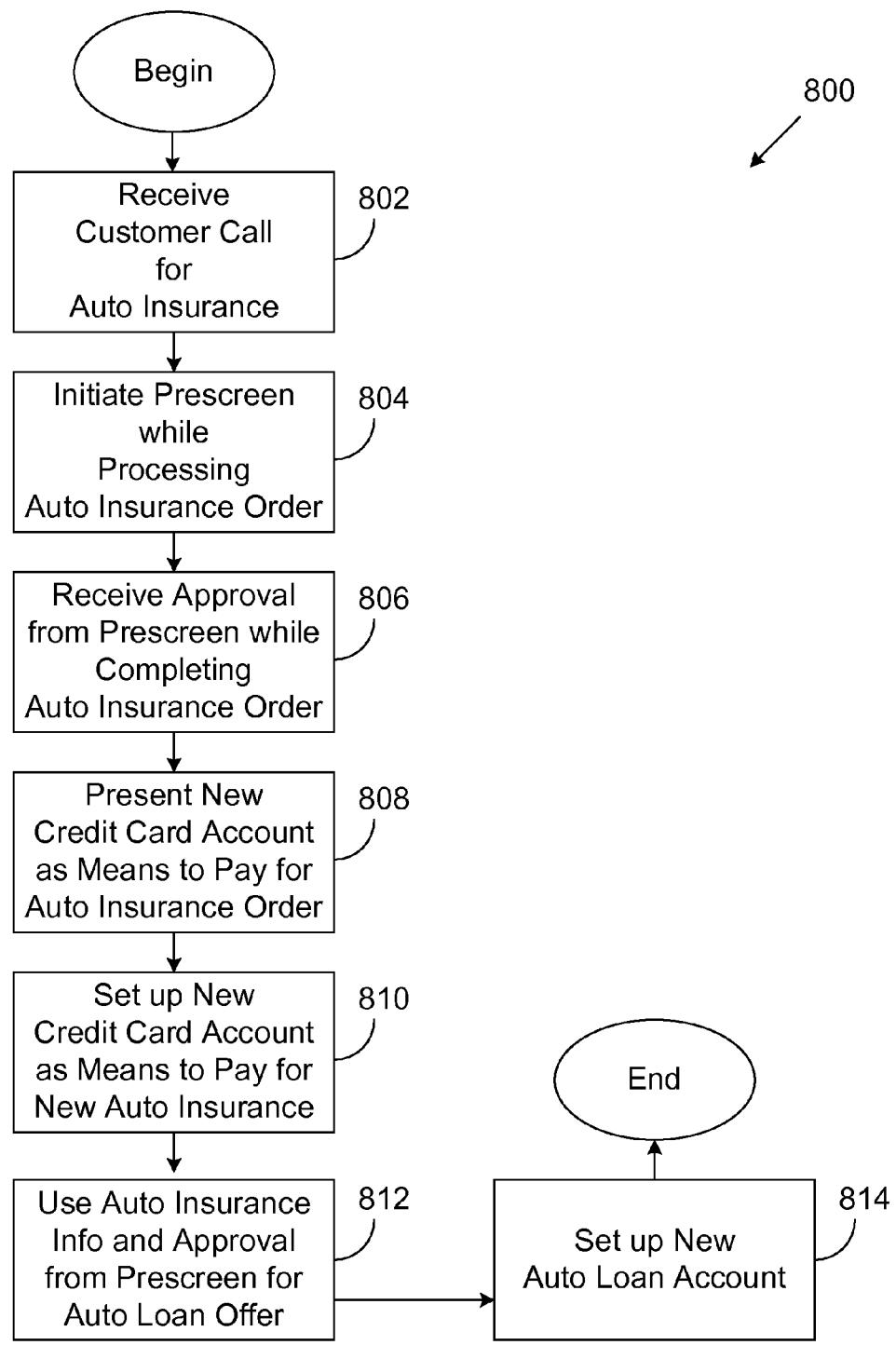
FIG. 8 illustrates a portion of another embodiment of an auto insurance purchase method that also includes a real-time prescreen of a customer for a credit card offer.

Referring to FIGS. 7 and 8, the foregoing embodiments and various implementations and manifestations thereof may be summarized in flowcharts, as shown in FIGS. 7 and 8. It should be noted that although the flow charts show a number of discrete steps, those having ordinary skill in the art will recognize that two or more steps may be combined into a single step, and an individual step may be divided into several component steps.

FIG. 7 illustrates a flowchart 700 for a portion of an embodiment of an auto insurance purchase method that includes a real-time prescreen of a customer for a credit card offer. The method begins at step 702 where a comprehensive integrated financial services institution receives a customer call for auto insurance for a car the customer is in the process of purchasing. The financial services institution may receive the call from the customer for auto insurance via a telephone call, a text-based online communication, an in-person office visit, or some other way of contact. The call may be to a CSR, as presented in FIG. 5 and its supporting description, or without the intervention or assistance of a human CSR, as presented in FIG. 6 and its supporting description.

In some embodiments, while the comprehensive integrated financial services institution is processing the order for auto insurance from the customer, the same financial services institution initiates a prescreen at step 704 to assess the customer's credit-worthiness for an unsolicited credit card offer. While completing the auto insurance order, the financial services institution receives at step 706 in real time the prescreen results—the customer is approved for a credit card from the financial services institution. At step 708, the customer is informed that he or she is approved for a new credit card, and that the new credit card can be used to pay premiums of the new auto insurance policy. On approval by the customer, the financial services institution sets up the new credit card account at step 710 as a means to pay premiums for the new auto insurance policy. In summary, the financial services institution is able with real-time prescreening to provide a customer with two products (i.e., auto insurance and a credit card) during a single call although the customer initially contacted the financial services institution in order potentially to purchase only one product (i.e., auto insurance).

FIG. 8 illustrates a flowchart 800 for a portion of another embodiment of an auto insurance purchase method that also includes a real-time prescreen of a customer for a credit card offer. The method begins at step 802 where a comprehensive integrated financial services institution receives a customer call for auto insurance for a car the customer is in the process of purchasing. Steps 804, 806, 808, and 810 are as previously described for steps 704, 706, 708, and 710, respectively, of FIG. 7. At step 812, the financial services institution uses the approval from the prescreen as well as information from the auto insurance order to prepare and present to the customer an auto loan offer. On approval by the customer, the financial services institution also sets up at step 814 a new auto loan account for the customer. The processing of the new auto loan may, in some embodiments, be as described in the applications of previously noted Table I "Applications for Comprehensive Online Load Transactions." In summary, the financial services institution is able with real-time processing to provide the customer with three products (i.e., auto insurance, a credit card, and an auto loan) although the customer initially contacted the financial services institution in order potentially to purchase only one product (i.e., auto insurance).

Figure 9:
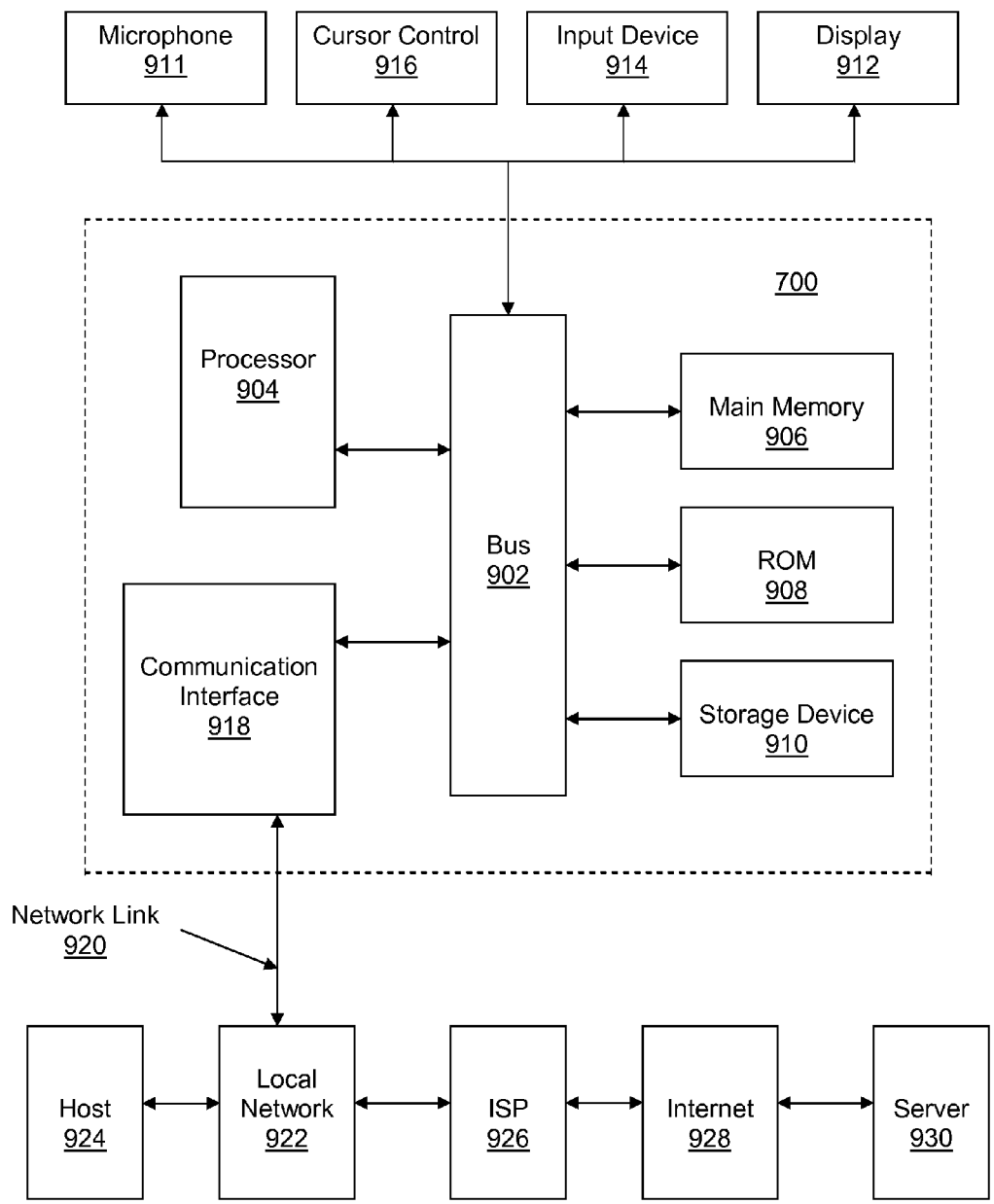
FIG. 9 illustrates, in block diagram form, a computer system upon which a system embodiment may be implemented, or reside, in whole or in part.

Referring to FIG. 9, a block diagram illustrates an exemplary computer or computing system 900 upon which process flows in accordance with principles of embodiments may be implemented or on which embodiments themselves may reside. Computer or computing system 900 includes a bus 902 or other communication mechanism for communicating information, and a processor 904 coupled with bus 902 for processing information. Computer or computing system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer or computing system 900 further includes a read only memory (ROM) 908 or other static storage device coupled to bus 902 for storing static information and instructions for processor 904. A storage device 910, such as a magnetic disk or an optical disk, is provided and coupled to bus 902 for storing information and instructions.

Computer or computing system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Microphone 911, another user input device, is coupled to bus 902 for communicating information (e.g., sound signals in the form of voice commands) to processor 904.

One or more populating acts may be provided by computer or computing system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform processes described herein. One or more processors in a multi-processing arrangement may also be employed to execute the sequences of instructions contained in main memory 906. In other embodiments, hard-wired circuitry may be used in place of, or in combination with, software instructions. Thus, embodiments are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media include, for example, optical or magnetic disks, such as the storage device 910. Volatile media include dynamic memory, such as main memory 906. Transmission media include coaxial cables, copper wire and fiber optics, including the wires that comprise bus 902. Transmission can take the form of acoustic or, on the electromagnetic spectrum, light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an and EPROM, a FLASH-EPROM, any other memory chip, stick or cartridge, a carrier wave as described hereinafter, or any other medium from which a computer can read.

Various forms of computer readable media may be involved in carrying one or more sequences of one or more instructions to processor 904 for execution. For example, the instructions may initially be borne on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer or computing system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network, now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer or computing system 900, are exemplary forms of carrier waves transporting the information.

Computer or computing system 900 can send messages and receive data, including program code, through the network(s), network link 920, and communication interface 918. In the Internet example, a server 930 might transmit a requested code for an application program through Internet 928, ISP 926, local network 922 and communication interface 918. One such application program may provide for, or participate in, sending or receiving data, such as, credit-related information, as described herein for various embodiments, to or from an offsite device. The received code may be executed by processor 904 as it is received, and/or stored in storage device 910, or other non-volatile storage for later execution. In this manner, computer or computing system 900 may obtain application code in the form of a carrier wave.

Additional disclosure for supporting systems and methods for real-time prescreening and real-time credit offers is found in the U.S. patent applications of previously noted Tables I, II, and III; each of the applications of Tables I, II, and III is again incorporated herein by reference in its entirety.

Again, following long-standing patent law convention, the terms "a" and "an" mean "one or more" when used in this application, including the claims. Furthermore, while the detailed description has been described with reference to one or more particular embodiments, those skilled in the art will recognize that many changes may be made thereto without departing from the spirit and scope of the description.

What is claimed is:

1. A computer-based system for real-time processing of credit information of a customer, the system comprising:
 a network; and
 a computing system connected to said network, said computing system configured to:
 receive in real time a request from a customer for an insurance policy;
 retrieve customer information for identifying the customer;
 submit the customer information to a network-linked service providing real-time credit prescreens;
 receive in real time an indicator of customer creditworthiness from the network-linked service;
 present in real time to a user interface an unsolicited credit offer for the customer in view of the indicator of customer credit-worthiness, wherein:
 the unsolicited credit offer is coupled with a suite of products tailored to the customer; and
 the suite of products includes software for participating in a bank service, received with a computer via Internet-based electronic delivery, wherein said software, when installed, enables the customer to deposit a check remotely using a computer plus a device for capturing a check image;
 accept acceptance of the unsolicited credit offer; and
 accept payment for the insurance policy at least in part on credit made available through the accepted unsolicited credit offer.

2. The system according to claim 1, wherein the customer information comprises one or more of name, address, social security number, and date of birth of said customer.

3. The system according to claim 1, wherein the network-linked service providing real-time credit prescreens is a service provided by a consumer credit reporting agency.

4. The system according to claim 1, wherein the computing system is further configured to set up in real time an automatic payment plan for the insurance policy using the customer's newly available credit.

5. The system according to claim 1, wherein the computing system is further configured to present in real time to the user interface, in view of the acceptance of the unsolicited credit offer and the insurance policy, an additional offer for another insurance policy for the customer premised upon the newly available credit.

6. The system according to claim 1, wherein the insurance policy is an auto insurance policy.

7. A non-transitory computer-readable medium having computer-readable instructions stored thereon for facilitating real-time processing of credit information of a customer, said computer-readable instructions comprising: instructions encoding a user interface; and
 instructions encoding a component controlling said user interface, said component configured to:
 receive in real time a request from a customer for an insurance policy;
 Retrieve customer information for identifying the customer;
 submit the customer information to a network-linked service providing real-time credit prescreens;
 receive in real time an indicator of customer credit-worthiness from the network-linked service;
 present in real time to user interface an unsolicited credit offer for the customer in view of the indicator of customer credit-worthiness, wherein:
 the unsolicited credit offer is coupled with a suite of products tailored to the customers; and
 the suite of products includes software for participating in a bank service, received with a computer via Internet-based electronic delivery, wherein said software, when installed, enables the customer to deposit a check remotely using a computer plus a device for capturing a check image;

accept acceptance of the unsolicited credit offer; and accept payment for the insurance policy at least in part on credit made available through the accepted unsolicited credit offer.

8. The non-transitory computer-readable medium according to claim 7, wherein the customer information comprises one or more of name, address, social security number, and the date of birth of said customer.

9. The non-transitory computer-readable medium according to claim 7, wherein the network-linked service providing real-time credit prescreens is a service provided by a consumer credit reporting agency.

10. The non-transitory computer-readable medium according to claim 7, wherein the component is further configured to set up in real time an automatic payment plan for the insurance policy using the customer's newly available credit.

11. The non-transitory computer-readable medium according to claim 7, wherein said computing system is further configured to present in real time to the user interface, in view of the acceptance of the unsolicited credit offer and the insurance policy, an additional offer for the another insurance policy for the customer premised upon the newly available credit.

12. The non-transitory computer-readable medium according to claim 7, wherein the insurance policy is an auto insurance policy.

13. A method for facilitating real-time processing of credit information of a customer, the method comprising:

receiving in real time a request from a customer for an insurance policy;

retrieving, by a computing system, customer information for identifying the customer;

submitting, by the computing system, the customer information to a computing system network-linked service providing real-time credit prescreens;

receiving in real time an indicator of customer credit-worthiness from the computing system network-linked service;

presenting in real time to a computing system user interface an unsolicited credit offer for the customer in view of the indicator of customer credit-worthiness, wherein:

the unsolicited credit offer is coupled with a suite of products tailored to the customer; and the suite of products includes software for participating in a bank service, received with a computer via Internet-based electronic delivery, wherein said software, when installed, enables the customer to deposit a check remotely using a computer plus a device for capturing a check image;

accepting acceptance of the unsolicited credit offer; and accepting payment for the insurance policy at least in part on credit made available through the accepted unsolicited credit offer.

14. The method according to claim 13, wherein the customer information comprises one or more of name, address, social security number, and date of birth of said customer.

15. The method according to claim 13, wherein the computing system network-linked service providing real-time credit prescreens is a service provided by a consumer credit reporting agency.

16. The method according to claim 13, wherein the method is further comprising setting up in real time an automatic payment plan for the insurance policy using the customer's newly available credit.

17. The method according to claim 13, wherein said method is further comprising presenting in real time to the computing system user interface, in view of the acceptance of the unsolicited credit offer and the insurance policy, an additional offer for another insurance policy for the customer premised upon the newly available credit.

18. The method according to claim 13, wherein the insurance policy is an auto insurance policy.

* * * * *

UNITED STATES PATENT AND TRADEMARK OFFICE
CERTIFICATE OF CORRECTION

| | | |
|---|---|---|
| PATENT NO. | : 8,762,259 B1 | Page 1 of 1 |
| APPLICATION NO. | : 11/859135 | |
| DATED | : June 24, 2014 | |
| INVENTOR(S) | : Tyo et al. | |

It is certified that error appears in the above-identified patent and that said Letters Patent is hereby corrected as shown below:

On the Title Page, Item [75], Delete "Elaine" and insert -- Elainie --

In the Claims

Column 18, Line 51, Claim 7, delete "Retrieve" and insert -- retrieve --

Column 18, Line 57, Claim 7, delete "to user" and insert -- to a user --

Column 18, Line 61, Claim 7, delete "customers" and insert -- customer --

Column 19, Line 7, Claim 8, delete "and the date" and insert -- and date --

Column 19, Line 21, Claim 11, delete "for the another" and insert -- for another --

Signed and Sealed this
Second Day of September, 2014

Michelle K. Lee
*Deputy Director of the United States Patent and Trademark Office*